July 8, 1969
H. VOORMAN, JR
3,454,941
COMPENSATED CURRENT BIMETALLIC SENSING DEVICE WITH
LAMP BURN-OUT INDICATING MEANS
Filed Jan. 12, 1967
Sheet 2 of 2
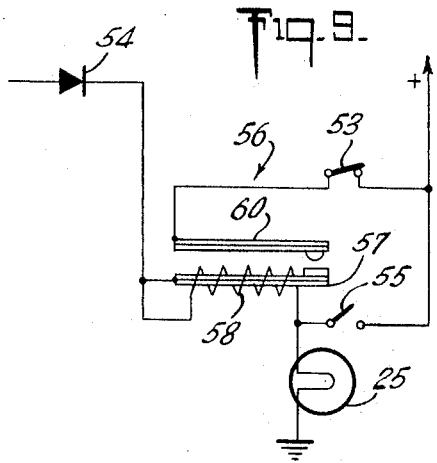
INVENTOR
HENRY VOORMAN JR.
BY Eyre, Mann, & Lucas
ATTORNEYS

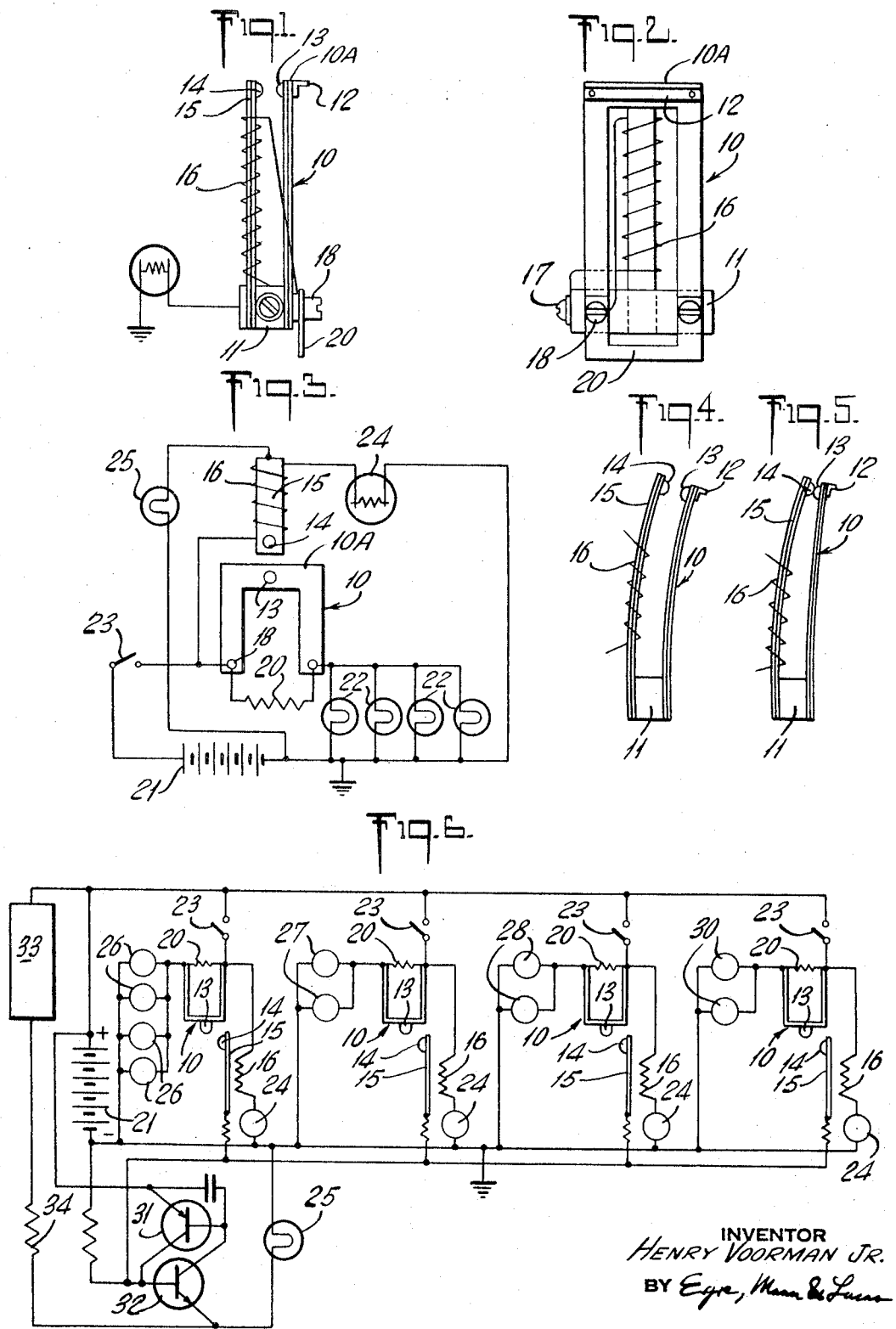

2

United States Patent Office 3,454,941
Patented July 8, 1969

3,454,941
COMPENSATED CURRENT BIMETALLIC SENSING DEVICE WITH LAMP BURN-OUT INDICATING MEANS
Henry Voorman, Jr., Midland Park, N.J., assignor to Wagner Electric Corporation, a corporation of Delaware
Filed Jan. 12, 1967, Ser. No. 608,768
Int. Cl. G08b *21/00;* H02h *3/04*
U.S. Cl. 340—251                     10 Claims

ABSTRACT OF THE DISCLOSURE

The current sensing device comprises a first bimetallic element of U-shaped construction. The free ends of the U-shaped piece are anchored to insulator blocks and the current to be sensed is passed through the entire length of the bimetallic material. A current shunt is connected across the anchored ends when the currents are large. A second bimetallic element is mounted adjacent to the first and a heater coil is wound around it. The heater coil is connected to the same voltage source which feeds the first element and both elements are arranged to bend in the same direction when heated.

---

This invention relates to a bimetallic sensing device having normally open contacts which close when a predetermined current is passed. The invention has particular relationship to voltage and temperature compensation means which permit the device to operate over a wide range of applied voltages and ambient temperatures. The device is sensitive to small current changes and is inexpensive to manufacture.

The current sensing device includes two elements, each a bimetallic strip which bends when the temperature changes. These elements are mounted in parallel relationship to each other and a contact is mounted on the movable end of each element so as to form a normally open pair. The first element is formed in the shape of a U with the ends secured to an insulated base, these ends forming terminals for connection to an electrical circuit. The second element includes a single cantilever of bimetallic material. Both elements are mounted so that they bend in the same direction when their temperatures are raised. A heater coil is wound on the cantilever element for heating and bending it when an electrical current is sent through the coil. The heater coil is connected to the same current source as the first element to compensate for a variable source voltage. A resistor may be connected across the terminals of the U-shaped element to act as an electrical shunt. The two bimetallic elements are coupled to an electrical circuit for determining the current flow from a power source to a load. An indicator is activated when the current through the load is less than a predetermined amount.

For a better understanding of the present invention, reference is made to the following description taken in connection with the accompanying drawings.

FIG. 1 is a side view of the sensing device showing the two temperature sensitive elements, the contacts, heater coil, ballast lamp, and shunt.

FIG. 2 is a front view of the sensing device showing the U-shape of the first element and the shunt resistor.

FIG. 3 is a circuit diagram of connections of the sensing device coupled to a bank of illuminating lamps to activate an indicator lamp when one of the lamps burns out or is disconnected.

FIG. 4 is a side view of the two sensitive elements showing how they both bend a like amount to keep the contacts open during the normal operation of the device.

FIG. 5 is a side view similar to FIG. 4 but showing the position of the elements (contacts closed) when the current sensed is less than the desired amount.

FIG. 6 is a schematic diagram of connections showing how four current sensing devices can be arranged to detect and indicate when any one of the lamps on an automobile burnt out.

FIG. 7 is a schematic diagram of connections similar to FIG. 6 but showing only two of the sensing devices. The circuit details of a flasher switch, a blocking relay, and a magnetic latching relay are added.

FIG. 8 is a perspective view of the blocking relay shown in FIG. 7.

FIG. 9 is a diagram of connections of a thermal latching relay which can be used in place of the semiconductor switch shown in FIG. 6 or the magnetic locking relay shown in FIG. 7.

FIG. 10 is a perspective view of the thermal locking relay which can be used in the circuit shown in FIG. 7.

Referring now to FIGS. 1, 2, 4 and 5, the sensing device includes a first U-shaped element 10 made of two dissimilar metals having unequal temperature coefficients of expansion. This element is secured to an insulator block 11 by two eyelets which form terminals for the element. The upper cross portion 10A of the element 10 is stiffened by a brace 12 or is made of thin steel to avoid cross bending. An electrical contact 13 is secured to the other side of the portion 10A to make contact with a similar contact 14 on a second temperature sensitive element 15. The second element 15 is a single bimetallic cantilever element and is secured to the same insulator 11 as the first element 10.

The second element 15 is for temperature and voltage compensation and, for this reason, a heater winding 16 is either wound around its central portion as shown in the figures or is placed in close proximity to the element so that the element is quickly heated by the current in the winding. The ends of winding 16 are held by terminal eyelets 17 and 18. The response times of both elements are adjusted so that they are equal in order to avoid contact during transient changes in voltage, such as switching pulses and other rapid voltage shifts.

It has been found convenient to make these sensing devices in only one size, rated at a definite current carrying capacity. When the desired current rating exceeds that of the first element 10, it is more convenient to install a simple shunt resistor 20 which at times may carry most of the current. In this way one type can be made standard and varying shunts 20 can be adjusted for whatever the application requires. Since the temperature sensitive element 10 has a low resistance, the shunt resistor 20 can be made of thin flat pieces of resistance metal such as Nichrome.

FIGS. 4 and 5 indicate the mode of operation. Under normal conditions the current through the heater wire 16 produces a deflection in element 15. But the current through the load, the shunt 20, and the U-shaped element also causes a deflection in element 10. If the load current is the desired value and if the shunt 20 has been chosen correctly, the two temperature responsive elements will bend in unison, as shown in FIG. 4 and the contacts 13–14 will remain open. If the current through the load is less than the desired current due to a burned out filament, the U-shaped element 10 will not receive the calculated current, it will not be deflected enough, and the contacts 13–14 will be closed.

The circuit shown in FIG. 3 indicates one way of connecting the sensing device to indicate a burned out lamp. In this circuit a source of electric power, which may be a storage battery 21, is connected to a plurality of lamps 22 in series with an on-off switch 23 and the U-shaped element 10. When switch 23 is closed, another circuit is completed which includes the battery 21, a ballast lamp 24 and heater winding 16. The first circuit through the lamps 22 and the element 10 heats the element and produces a deflection in both legs, moving the contact 14 toward the contact 14. The second circuit through the ballast lamp 24 and the heater 16 heats the second element 15 and produces a defletcion which moves the contact 14 away from contact 13. If all the lamps 22 are in working order and if the shunt resistor 20 has the correct value, the distance between the contacts 13 and 14 will not change and no current will pass between them. If one of the lamps 22 is burned out or if a lamp has been removed, less current passes through the legs of element 10 and the deflection is reduced, causing the contacts 13, 14 to close and send current from the battery 21 through the switch 23 and the left leg of element 10 to contacts 13, 14, through element 15, an indicator lamp 25 and back to the other side of the battery. The indicator lamp 25 tells an operator that one of the lamps 22 (which may be at a remote location) is burned out and should be replaced.

If the source of electric power is a battery 21 as indicated in FIGS. 3 and 6, the system can have its voltage variable from about 11 to 15 volts. This variation produces a current change which is less than that which would result if resistors were used as circuit elements. The tungsten filaments in the lamps have nonlinear temperature-resistance characteristics and at low currents the filament resistance is less than the resistance at higher currents. For this reason the ballast lamp 24 has been added to the heater to compensate for the change in current values.

One of the applications of the invention is in an automobile to determine whether all the lamps are in good working order. A single indicator lamp is mounted on the panel in front of the driver and, if it is lighted at any time, the driver knows that a lamp should be replaced. Since automobile lamps vary considerably in current and power values it is preferable to employ four current sensing elements to cover all the lamp groups. A circuit for this application is shown in FIG. 6 where one group of stop and parking lamps 26 is connected to a current sensing device as described above. The tail lamps 27 form another group as do the high beam portions 28 and the low beam portions 30 of the headlamps. Each group has its own current sensing device. Since the same lamps are used for stop lights and turn signals, means are provided to prevent false lighting of the indicator when turn signals are used. Also, since the stop lights are used only for short periods, latching means are provided to keep the indicator lamp on after the brake pedal is released if a braking lamp is burned out.

Each sensing device contains the same components as described above in connection with FIG. 3 except that only a single indicator lamp 25 is used and this lamp is coupled to the four sensing devices by means of a semiconductor latching circuit. A magnetic locking relay or a thermal latching relay may be used in place of the semiconductor circuit.

The latching circuit includes two transistors 31 and 32 with the collector of each transistor connected to the base of the other transistor. This combination acts in a manner similar to a silicon controlled rectifier which normally conducts no current but when a voltage is applied to a firing electrode (base of transistor 32), the combination passes current from the emitter of transistor 31, through its collector to the base of transistor 32 and its emitter. This current lights the indicator lamp 25 to signal a burned out lamp. This circuit has the advantage of permitting another type of control. When a flasher circuit 33 is being operated to indicate a planned turn, a positive voltage is applied through resistor 34 to the emitter electrode of transistor 32, thereby making it insensitive to the control pulses which are applied from the current sensitive devices to the base of this transistor. This inhibiting action prevents false signals since with the control circuit through resistor 34, lamp 25 is not lighted during flasher operation.

Referring now to FIG. 7, this circuit includes two current sensing devices which are the same as the sensing devices shown in FIG. 6 except that a variable resistor 37 is connected in parallel with heater coil 16 to make an adjustment for sensitivity balance. Also, a thermal blocking relay 40 has been connected in series between the ballast lamp 24 and the ground conductor. The details of this relay are shown in FIG. 8. The blocking relay includes a bimetallic strip 41, a compensating bimetallic strip 42, and a heater coil 43 connected between the positive current conductor and a portion of the flasher circuit.

A turn signal switch 44 is connected to the flasher circuit 33 for using the brake lamps when switch 23A is closed by the brake pedal. This signal also permits flashing either the right front and rear lamps 26B when turning to the right or the left front and rear lamps 26A when turning in the other direction. Switch 44 includes normally open contacts 45A and 45B and normally closed contacts 46A and 46B. A conductor 47 connects the current sensing device 10 with normally closed contacts 46A and B so that the rear lamps are lighted whenever the brake switch 23A is closed.

When an operator signals a left turn, switch element 48 is manually moved to the left, joining contacts 45A and the conductive portion of element 48, and opening contacts 46A. This action connects lamps (left, front and rear) 26A in series with the flasher 33 and current is also supplied from the flasher unit 33, over conductor 49 to heater winding 43 and the positive conductor. When the flasher unit conducts, winding 43 is shorted, but when the flasher is non-conductive, current flows through the heater winding 43 and through the lamps to the ground conductor. The heat generated by the winding 43 opens the contacts of the blocking relay 40 and the sensing device 10 is made inoperative. The blocking relay 40 and its heater winding 43 are so designed that the blocking contacts open before contacts 13-14 are closed and in this manner the outage lamp 25 is not lighted during the time the flasher is operating.

In FIG. 6, a semiconductor combination 31-32 is employed to provide a latching circuit. In FIG. 7, a magnetic relay 50 is used for the same purpose. The relay 50 includes a winding 51 connected between the compensating strip 15 and the outage signal lamp 25. A pair of normally open relay contacts 52 are connected between the winding 51 and the positive conductor to act as a holding means. The ignition switch 53 of the vehicle is connected in series with this circuit whereby when the ignition is turned off, the circuit will automatically reset if it has been previously activated in response to a defective lamp and such lamp has been replaced. A diode 54 blocks the positive current flow through switch 53 and contacts 52 from entering the sensing device when the relay 50 has been operated.

There may be times when the operator may wish to test the outage indicator lamp 25 to be sure that the lamp has not burned out. A test switch 55, which is preferably a part of the ignition switch 53, is connected between one terminal of lamp 25 and the positive conductor. When switch 55 is closed the lamp 25 is lighted.

The magnetic relay latching means 50 may be replaced by a thermal latching circuit 56 illustrated in FIG. 9 which includes a bimetallic strip 57, a heater winding 58 around or adjacent to strip 57, and a compensating bimetallic strip 60. A pair of contacts (normally open) is closed when current is applied to the heater 58 and, when the contacts are closed, they remain in their actuated condition because current is then applied to the winding 58 from the positive conductor, through strip 60, the contacts, strip 57, heater 58, and lamp 25, to ground. The contacts stay closed and lamp 25 remains lighted until switch 53 is opened.

In the above description, the current sensitive element has been described as having the form of an inverted U.

It is obvious that an inverted V shape can be used instead.

Experiments have shown that the current sensing device as described above, operates to signal the existance of a burned out lamp even if it is one of nine lamps on the same circuit. The device functions without failure within the voltage range of 11 to 15 applied volts from the battery 21. It is obvious that the device is also compensated for ambient temperatures since the two bimetal strips are made of similar materials and their free ends are displaced a similar distance when both their temperatures are varied by the same degree.

What is claimed is:

1. A current sensing device comprising; a first bimetallic temperature sensitive element having two spaced portions anchored to a base and a third movable portion which is remote from said base, a first electrical contact secured to said movable portion; a second bimetallic temperature sensitive element adjacent to the first element, one portion of said second element being anchored to said base and another portion being movable and remote from said base, a second electrical contact secured to said movable portion of said second element, said first and second contacts being aligned for make and break contact with each other, an electrical heater positioned in close proximity to said second element for heating it when current is applied to said heater; a first electrical circuit which includes a source of potential, a plurality of lamps connected in parallel with each other and the terminals of said first element, said first circuit energizing said lamps and heating said first element by current passage therethrough to deflect the movable portion of said first element and thereby move said first contact away from said second contact; a second electrical circuit which includes said source of potential, said heater, and a ballast lamp, said second circuit for producing a current which heats said second bimetallic element and deflects the movable portion of said second element so that said second contact is moved toward said first contact; and an indicator circuit which includes said source of potential, said first and second contacts, and an indicator lamp which is lighted whenever said first and second contacts are closed.

2. A current sensing device as claimed in claim 1 wherein, said first element is U-shaped within the ends of the legs of the U constituting said spaced anchored portions and the base of the U constituting said movable remote portion, a resistor shunt connected across the two ends of the U-shaped element to permit more current to flow through the first circuit and the plurality of lamps.

3. A current sensing device as claimed in claim 2 wherein a brace is secured to the movable portion of said first element to prevent cross bending of the movable portion when the temperature of the element changes.

4. A current sensing device as claimed in claim 1 wherein said electrical heater includes a heater wire which is wound around said second element to raise its temperature when the device is operating.

5. A current sensing device as claimed in claim 1 wherein said ballast lamp includes a filament having the same non-linear current-resistance characteristics as the filament in said plurality of lamps.

6. A current sensing device as claimed in claim 1 wherein said indicator lamp is coupled to the indicator circuit by means of a normally non-conducing latching circuit which is triggered into conduction by the current passing through said first and second contacts and said second element.

7. A current sensing device as claimed in claim 6 wherein said latching circuit includes two semiconductor transistors, each having a base, an emitter, and a collector electrode, with the collector electrode of each transistor connected to the base electrode of the other transistor.

8. A current sensing device as claimed in claim 6 wherein said circuit is coupled to a flashing means for indicating a turn signal, a connection between said flasher means and a portion of the latching circuit for disabling the latching circuit during the time intervals the flashing means turns off the lamps.

9. A current sensing device as claimed in claim 6 wherein said latching circuit includes a magnetic relay having a winding connected between said second bimetallic element and said indicator lamp, and a pair of normally open contacts connected between the positive terminal of the source of power and one end of the relay winding.

10. A current sensing device as claimed in claim 6 wherein said latching circuit includes a first bimetallic strip having a heater winding, said first strip connected to said second temperature sensitive element and having an electrical contact mounted on its free end, a second bimetallic strip mounted adjacent to the first and having an electrical contact on its free end to cooperate with the contact on the first strip, said second strip connected to the positive terminal of the source of power.

References Cited

UNITED STATES PATENTS

| 1,700,226 | 1/1929 | House. |
| 2,704,841 | 3/1955 | Van Ryan. |
| 3,207,875 | 9/1965 | Bagnall et al. _ _ _ _ _ _ 317—40 XR |
| 3,293,489 | 12/1966 | Marshall _ _ _ _ _ _ _ _ _ 315—82 XR |

FOREIGN PATENTS

| 255,568 | 7/1926 | Great Britain. |

JOHN W. CALDWELL, *Primary Examiner.*

DANIEL K. MYER, *Assistant Examiner.*

U.S. Cl. X.R.

307—131; 315—82; 340—73, 80